Feb. 12, 1924.

B. T. STEBER 1,483,393

PRECISION JIG BORING MACHINE

Filed July 1, 1921  5 Sheets-Sheet 2

Inventor
Bernard T. Steber
By Edgar W. Kitchin
his Attorney

Feb. 12, 1924.  
B. T. STEBER  
1,483,393  
PRECISION JIG BORING MACHINE  
Filed July 1, 1921  
5 Sheets-Sheet 3
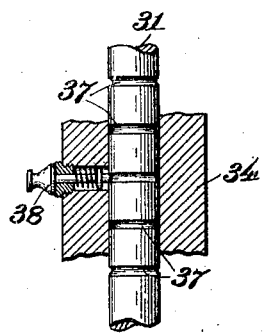
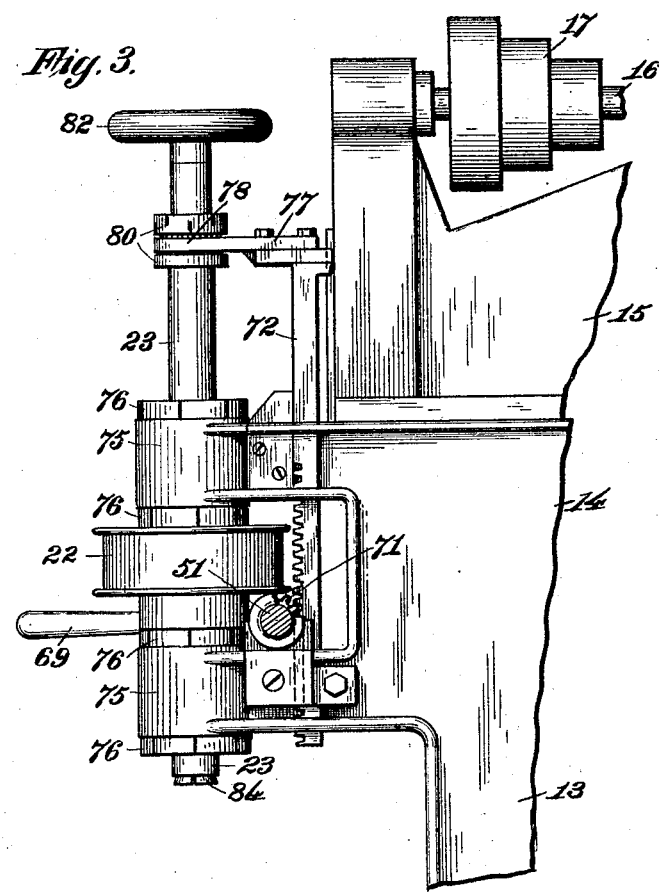
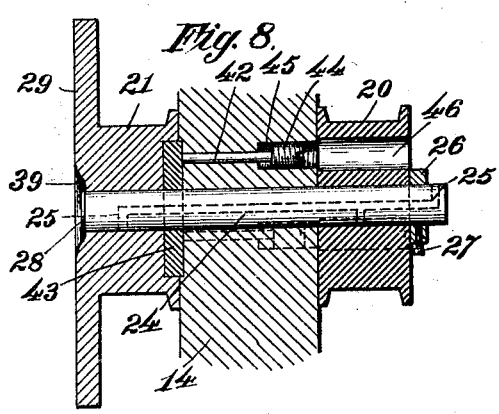
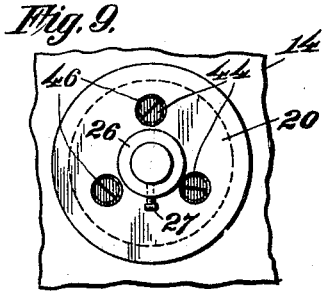
Inventor  
*Bernard T. Steber*  
By *Edgar W. Kitchin*  
his Attorney

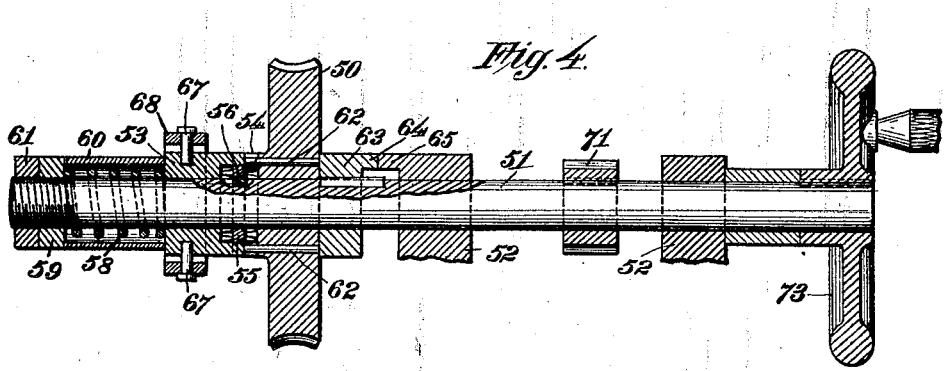
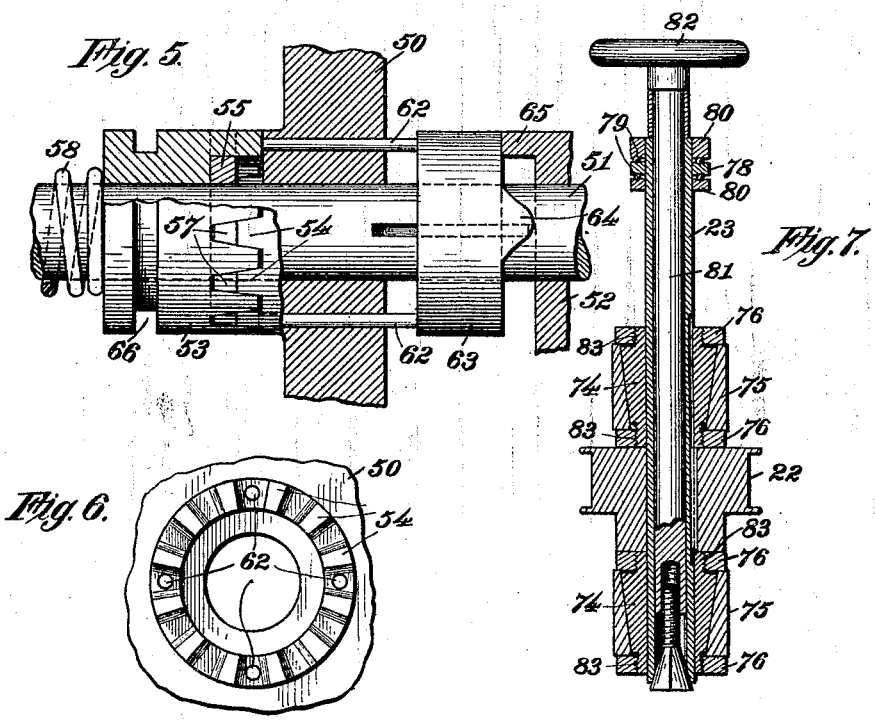

Feb. 12, 1924.

B. T. STEBER 1,483,393

PRECISION JIG BORING MACHINE

Filed July 1, 1921

Inventor
Bernard T. Steber
By Edgar M. Kitchin,
his Attorney.

Patented Feb. 12, 1924.

1,483,393

UNITED STATES PATENT OFFICE.

BERNARD T. STEBER, OF UTICA, NEW YORK.

PRECISION JIG-BORING MACHINE.

Application filed July 1, 1921. Serial No. 481,828.

*To all whom it may concern:*

Be it known that I, BERNARD T. STEBER, a citizen of the United States, residing at Utica, in the county of Oneida and State of New York, have invented certain new and useful Improvements in Precision Jig-Boring Machines; and I do hereby declare the following to be a full, clear, and exact description of the invention, such as will enable others skilled in the art to which it appertains to make and use the same.

This invention relates to improvements in boring machines, and has as its primary object the refinement of precision in the formation and location of apertures or recesses in material both with respect to the proportions of each recess and its relation to others, the unit of measurement being that of the micrometer division of one ten-thousandth of an inch or less.

With this and other detail objects in view as will in part hereinafter become apparent and in part be stated, the invention comprises certain novel constructions, combinations and arrangements of parts as subsequently specified and claimed.

In the accompanying drawings,—

Figure 3 is a fragmentary view in side elevation looking at the opposite side to that seen in Figure 1, the driving belt being removed.

Figure 4 is a fragmentary, vertical section taken on the plane indicated by line 4—4 of Figure 1, parts being seen in elevation, and the parts being shown out of clutch.

Figure 5 is a similar view of the clutch portions of the parts seen in Figure 4, parts being broken away and the clutch members being shown in clutch.

Figure 6 is a fragmentary face view of the clutch hub portion of the worm gear detached.

Figure 7 is a fragmentary, vertical section taken along the main spindle approximately on the plane indicated by line 7—7 of Figure 1, and looking in the direction indicated by the arrow but with adjacent parts omitted.

Figure 8 is an enlarged, detail, fragmentary, axial section taken through the rear idler pulleys and adjacent parts, parts being seen in elevation.

Figure 9 is a side view of the parts seen in Figure 8 with the friction disc omitted.

Figure 10 is an enlarged, detail, fragmentary section taken approximately on the plane indicated by line 10—10 of Figure 1.

Figure 11 is an enlarged, detail, fragmentary axial section through the lower end portion of the main spindle and its enclosed parts, part of the collet bar being seen in elevation.

In the making of holes in parts which must be constructed with precision, such, for instance, as gun-work, sewing machines, automobile parts, and interchangeable parts of other apparatus, it is customary to clamp the parts to be bored in drill jigs which contain hardened steel bushings for guiding the drills so that the holes will be identical. It will thus be understood that the jigs used for such work as this must themselves be made with extreme accuracy. The present invention is designed for the making of such drill jigs and the assurance of their exact precision, and it is one of the objects of the present invention to provide for the accurate spacing and boring of the holes in the drill jig. One method now commonly practiced by tool makers involves the employment of a master plate and square wherein size blocks of guaranteed accuracy are spaced between the work and the parts of the square corresponding to the required distance apart for the holes. In this method, the master plate, square and size blocks are clamped to the face plate of an ordinary lathe, and the combinations of the blocks are varied for adjusting the work each time a new hole is to be bored, and this is continued until all of the holes are correctly bored. There are obvious difficulties in this method arising from the fact that the lathe spindle is horizontal and the face plate is vertical, which leads to difficulty in keeping the little size blocks in place while being adjusted. Beside the loss of time thus represented, the lathe, if used for other purposes, is liable to get "out of true," and further difficulty arises when the work happens to be longer than can be accommodated in a small lathe, which condition would necessitate the employment of a clumsy lathe with a large face plate. Some times, for these reasons, a milling machine is used whereon the plate, upon which the work is to be clamped, lies in a horizontal plane, but the milling machine plate is mounted on a movable slide which, in turn, is mounted on other slidable parts, and it is found in practice that extreme accuracy is difficult if not impossible to attain with so many moving parts where the bearings must have a little play in order to move freely, but which play will record differently at different times. It will be understood, of course, that when the work is clamped to a lathe, the work revolves with the face plate while clamped to a milling machine bed the boring tool revolves and the work stands still.

On the present improved machine, the work is clamped on a stationary plate and the boring tool is revolved.

Figure 12:
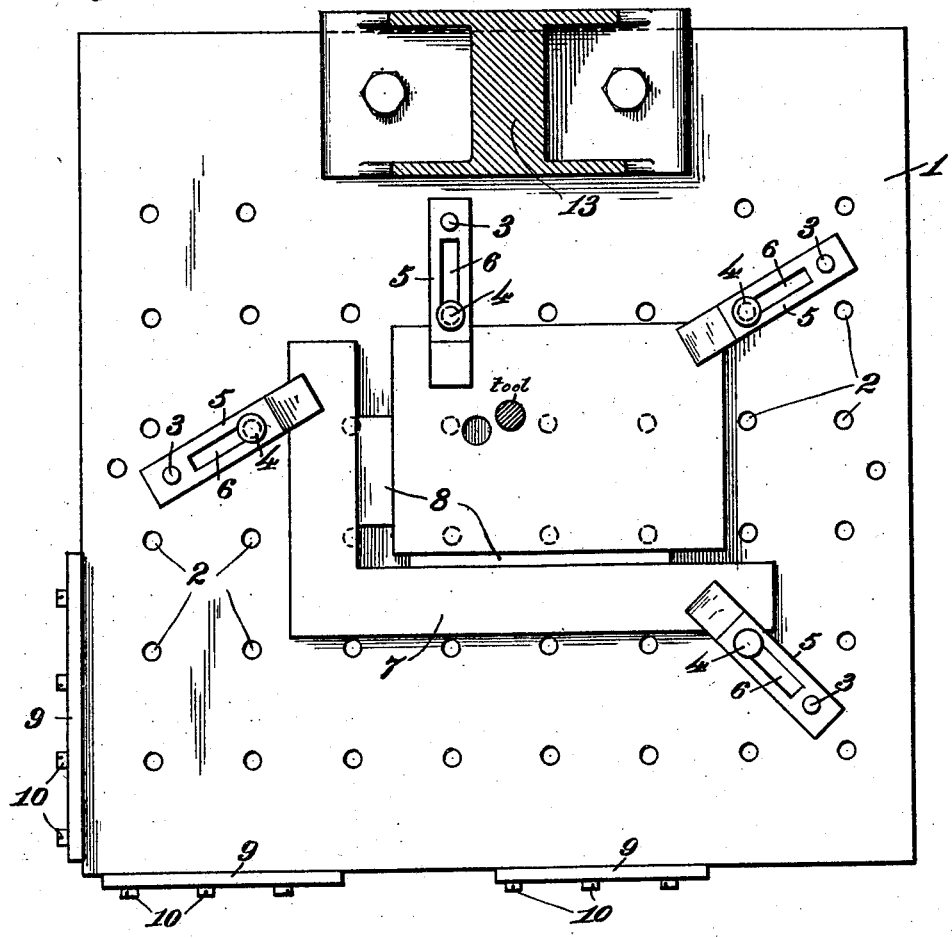
Figure 12 is a plan view of the instrument table with an illustrative arrangement of instruments thereon, the standard of the main frame being seen in section.

Referring to the drawings by numerals, 1 indicates the working table or bed plate which is supported on any appropriate stand, parts of which are broken away in the drawings for saving of space. As best seen in Figure 12, the plate 1 is formed with a number of threaded apertures 2 for receiving the clamping bolts 4 of clamps 5. Each clamp 5 is formed with a slot 6 for accommodating its respective bolt 4 and allowing adjustment of the clamp, the clamping action being completed through the operation of a tension screw 3 provided for each clamp 5 and arranged with its head in position for engaging the face of plate 1. The square 7 and appropriate size blocks 8, 8 are employed for locating the plate 9. which is the part being operated upon. When the plate to be operated upon is too large to allow the employment of the square 7, a substitute for such square is provided in the application of edge plates 9, 9 clamped by bolts 10 to the edges of the table or face plate 1. Each plate 9 is preferably slotted at 11 for each bolt 10, so that the respective plates 9 may be adjusted longitudinally as required, and the edges of the plate 1 are formed with spaced threaded apertures 12 for greater adjustments of the plates 9 than permitted by the slots 11, there being enough of the apertures 12 spaced about the several edges of plate 1 to allow plates 9 to be located as well as adjusted as required, according to the work to be operated upon.

Figure 2:
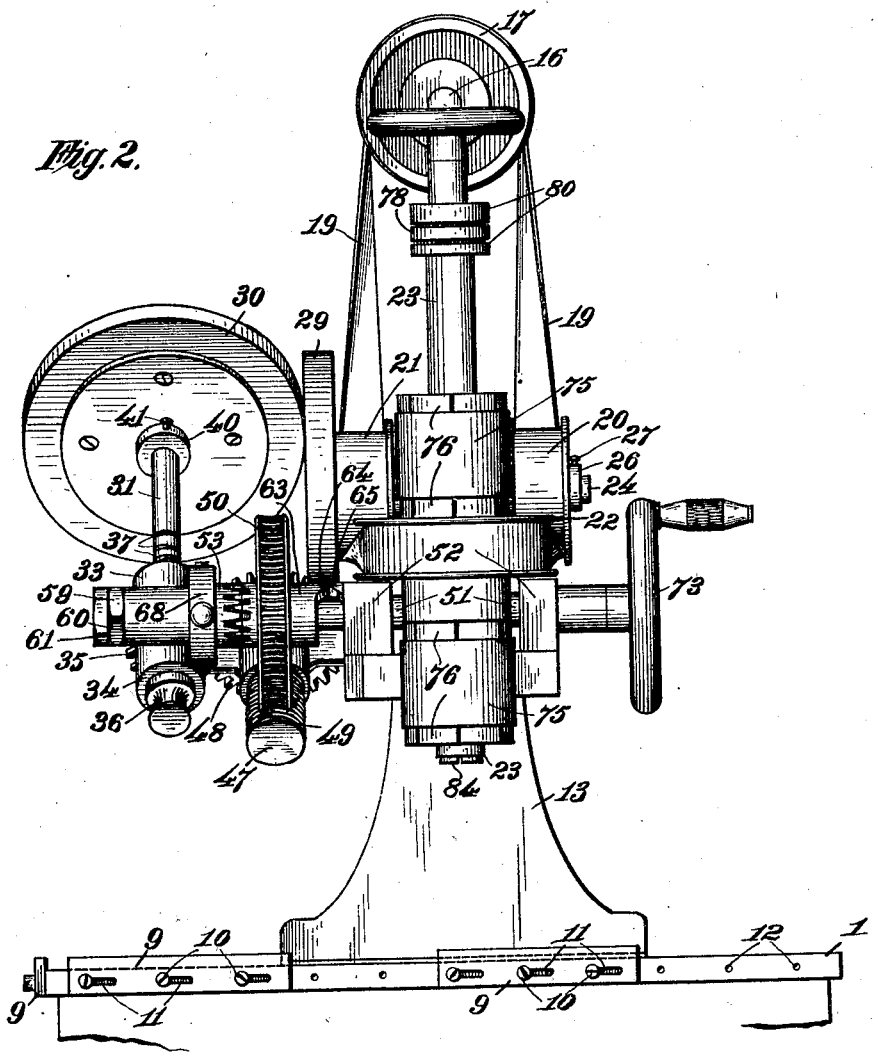
Figure 2 is a front view thereof.
Figure 14:
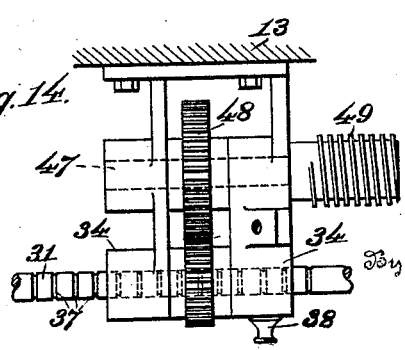
Figure 14 is a fragmentary plan of the lateral brackets and driving gears taken from a plane lying parallel to the longitudinal axis of the friction gear driven shaft.

Mounted on the table 1 is the standard 13 of the main frame 14 of the machine. Upstanding from the main frame 14 is a supplemental frame 15 which is bifurcated at its upper portion and provided with journal bearings in which is journaled the shaft 16 carrying the usual cone pulley 17 and projecting rearwardly beyond the rear arm of the supplemental frame 15. Fixed to such rear portion of shaft 16 is a driving pulley 18 over which is passed a belt 19, which extends downwardly and is laced about idler pulleys 20 and 21 (best seen in Figures 2 and 8) and passing thence about a pulley 22 keyed to the main spindle 23 hereinafter described, or otherwise fixed thereto in any suitable manner. The employment of the pulleys 20 and 21 enables the endless belt 19 to have both of its laps turned from a vertical to a horizontal path of travel, so as to receive power from the vertically-disposed pulley 18 and deliver power to the horizontally-disposed pulley 22.

Figure 1:
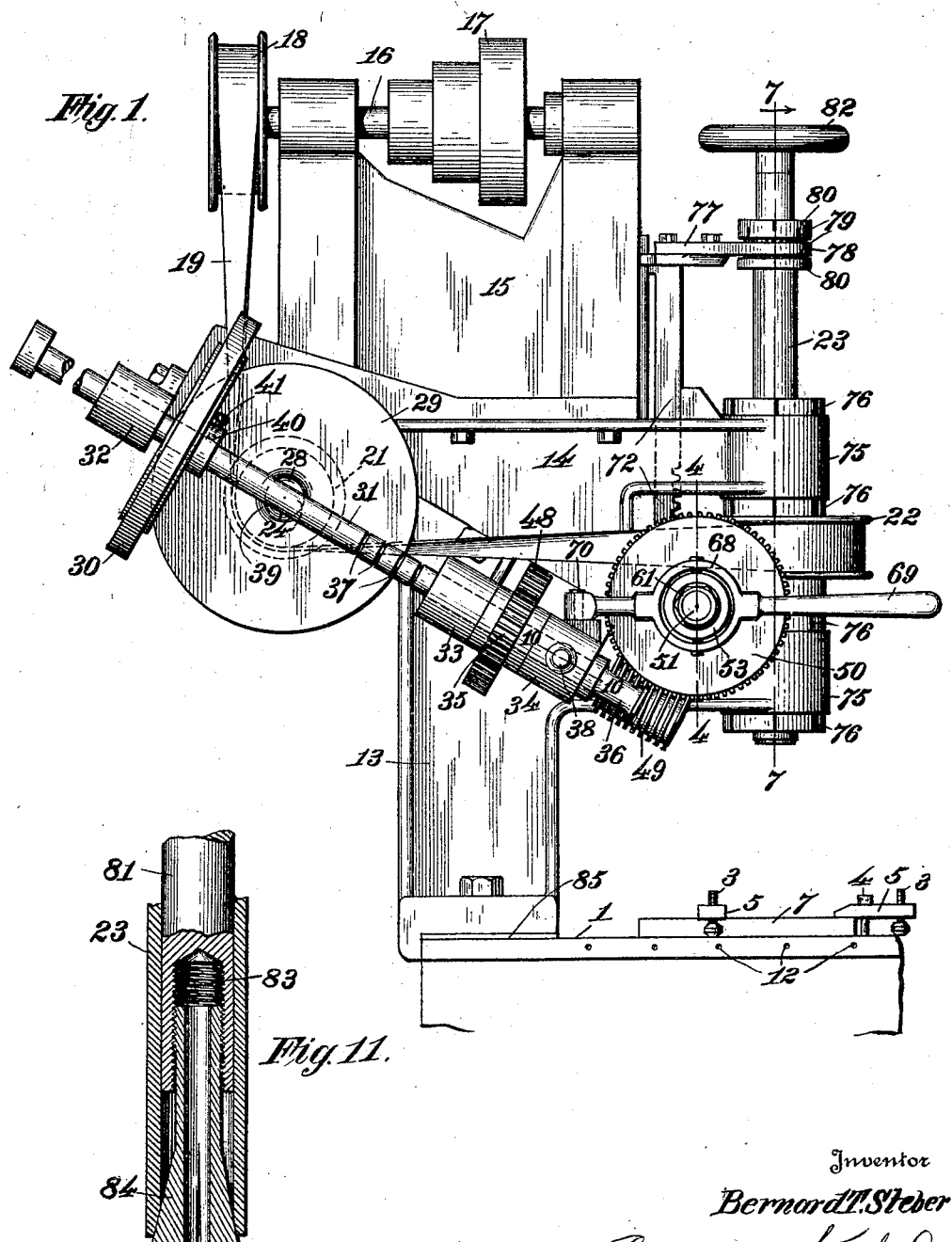
Figure 1 is a side elevation of an apparatus embodying the features of the present invention.

As best seen in Figure 8, the pulleys 20 and 21 are mounted on a shaft 24 extending through and fixed in the frame 14. Lubricating ports 25 are preferably formed in the shaft 24 for supplying lubricant to the pulleys 20 and 21, and pulley 20 is retained on the shaft 24 by a collar 26 adjustably fixed to the shaft 24 by a set screw 27. Pulley 21 is retained against axial separation from shaft 24 by a head 28 on the shaft spaced slightly from the adjacent parts of the pulley 21 to allow of axial adjustment thereof. The pulleys 20 and 21 are flanged for guiding belt 19, and the outer flange of pulley 21 is enlarged to form a friction disc 29 designed to engage and actuate a friction gear 30 fixed to a shaft 31 extending across the extended axis of the shaft 24. Shaft 31 is slidingly mounted in a sleeve bracket 32 extending laterally from the rear portion of frame 14 and in a pair of spaced or similar brackets 33 and 34 extending laterally from an intermediate portion of frame 14. Keyed to the shaft 31 between the brackets 33 and 34 is a pinion 35 arranged to be revolved by the shaft 31, while leaving the shaft free to slide longitudinally through its several supporting sleeve brackets and through the pinion. The shaft 31 is arranged in an inclined plane, and at its lower forward end is provided with an operating handle 36 adapted to be grasped by the operator for shifting the shaft for moving the gear 30 across the face of the friction disc 29. The shaft 31 is formed with a series of annular grooves 37, and a spring-pressed pin 38 is carried by the sleeve 34 in position for normally engaging one of the grooves 37 for retaining the shaft 31 in any given adjusted position. To vary the location of the gear 30 with respect to the friction disc 29, it is only necessary to pull out the pin 38, grasp the handle 36, shift the shaft 31 to the desired position, and allow the pin 38 to drop back into the newly-positioned groove 37. Thus the gear 30 may be moved from the rapidly driven position near the periphery of disc 29, as seen in Figure 1, inward relative to the disc 29 for decreasing the speed until it reaches the axis of the disc 29. It will be noted that the disc 29 is formed with a depression or recess 39 about its axis in which the periphery of the gear 30 may lie out of contact with the disc and allow the gear to remain stationary while the disc 29 revolves. Further movement of the gear 30 carrying it beyond the axis will bring it into contact with the surface of the friction disc 29 in position for receiving reverse motion, and the speed of such motion may be increased from the minimum adjacent the depression 39 to the maximum at the periphery of the disc 29. To enable adjustment of the gear 30 on its shaft 31, the gear is provided with a boss 40 having a set screw 41 for locking the gear 30 to the shaft 31.

In order to take up wear between gear 30 and friction disc 29, provision is made for the adjustment of the disc 29 along its shaft 24 toward gear 30, this being preferably accomplished by the employment of a series of pins 42 engaging the pulley 21 and adjustable axially with respect thereto. There may be any desired number of pins 42, a minimum of three being preferably used, as seen in Figure 9, one end of each pin resting against a washer 43 let into the face of the pulley 21. The opposite end portion of each pin 42 from that engaging the washer 43 is preferably enlarged and threaded to form a screw portion 44, which is threaded into an appropriately-arranged threaded aperture 45 in the frame 14. Each screw portion 44 has its outer end formed with a kerf to receive a screw-driver, the pulley 20 being formed with apertures 46 adapted to register with the apertures 45 and of a size to admit the introduction of a screw-driver to the kerf of the respective screw portion 44, whereby the pins 42 may be adjusted for moving the friction disc 29 toward the gear 30.

Journaled in the brackets 33 and 34 between the pinion 35 and the main frame 14 is a shaft 47 carrying a gear wheel 48 meshing with the pinion 35. The forward portion of shaft 47 extends beyond its bearing in the bracket 34 and is formed with a worm 49, which meshes with a worm gear 50. The worm gear 50, as best seen in Figures 4 and 5, is journaled on a transverse shaft 51, which shaft is, in turn, journaled in brackets 52 outstanding forwardly from the frame 14. Slidingly and rotatably mounted on the shaft 51, outside of the face of and spaced from the worm gear 50, is a clutch member 53 having clutch teeth directed axially toward the gear 50, and the gear 50, in turn, is formed with a hub provided with clutch teeth 54 directed toward and adapted to intermesh with the clutch teeth of clutch member 53. Interposed between these two clutch members is a clutch collar 55, consisting of a ring or annulus keyed at 56 (as seen in Figure 4) to the shaft 51 and having a series of radial notches corresponding and proportioned in size to the clutch teeth of clutch member 53, leaving a corresponding series of radial outstanding projections 57 corresponding substantially to the space between the teeth of the clutch member 53, whereby the said teeth may pass between the projections 57, when permitted to do so, and interlock with the teeth 54 of the hub clutch member of gear 50. A spring 58 is employed about the shaft 51 outside of the clutch member 53, and is held in tension by the nut 59 threaded onto the end portion of shaft 51 for stressing the clutch member 53 toward a clutching position with the clutch member of the gear 50. A sleeve or housing 60 preferably encloses the spring 58 and extends from the nut 59 to the clutch member 53 when the clutch member is in its open or unclutched position. Housing 60 thus limits the outward movement of the clutch when opened by hand. A second nut 61 is threaded onto shaft 51 into engagement with nut 59 for binding the parts and preventing accidental displacement thereof.

A series of axially shiftable pins 62 is arranged in the hub portion of the gear 50 to slide longitudinally with respect to the shaft 51, each pin 62 being located in the line of the opening between the teeth 54, as clearly seen in Figure 6, so as to contact with the ends of the teeth of the clutch member 53. A collar 63 surrounds and is slidingly keyed to the shaft 51 adjacent the inner face of the gear wheel 50, and is provided at one point with a laterally extending cam 64 adapted to co-operate with a corresponding stationary cam 65 extending from the bracket 52. The outer face of the collar 63 engages the inner ends of the pins 62, so that when the collar 63 is revolved with the shaft 51 until the cams 64 and 65 come in contact, further movement, causing the collar 63 to slide axially under the camming action, will cause the pins 62 to be moved longitudinally and to correspondingly shift the clutch member 53 against the pressure of spring 58, and continued movement of this character will finally bring the collar 63 to the position shown in Figure 4, whereat the pins 62 have reached the point where the clutch teeth of clutch member 53 are outside the line of the teeth 54 and in line with the inner face of the ring 55 and its projections 57, so that revolution of the gear 50 may continue without causing further movement of the shaft 51, the ends of the pins 62 riding across the inner faces of the teeth of clutch member 53 and across the inner faces of the projections 57.

To enable manual control of the clutch just described, the clutch member 53 is formed with an annular groove 66 engaged by pins 67 of the usual type carried by collar 68 forming part of a hand-operated lever 69, projecting toward the front of the machine in position to be engaged by the operator and pivoted at its rear end, as indicated at 70, to the bracket 34.

The shaft 51 carries the rack-engaging pinion 71 in position for meshing with the teeth of the vertical rack 72 slidingly mounted in the forward part of the frame 14. The end portion of shaft 51, opposite that carrying the clutch parts just described, projects beyond the side of the frame and is provided with a hand wheel 73 for starting operations and for controlling and varying conditions manually when required.

Pulley 22 is splined to the main spindle 23, so that the latter may move longitudinally while receiving power from the pulley, the said spindle being slidingly and rotatably mounted in bearings 74, 74, carried by brackets 75 outstanding forwardly from the frame 14, the bearings being each held in place by clamping nuts 76, 76. Fixed to the upper end of the rack 72 is an outstanding bracket 77, terminating at its outer end in a ring 78 formed in its upper and lower faces with raceways for ball or similar bearings 79, 79. The ring 78 surrounds the upper end of the main spindle 23 and is connected thereto through the balls 79 retained by upper and lower raceway rings 80, 80, fixed to the main spindle 23 so as to leave the main spindle free to rotate while being shifted longitudinally by the action of the rack 72.

Within the spindle 23 is arranged the collet bar 81 whose upper end is engaged by a hand wheel 82, and whose lower end is bored and tapped to form a threaded opening 83 for receiving the collet 84. Obviously, a number of collets of different sizes may be provided for application to the bar 81, according to the character of boring instrument to be engaged. The manner of engagement of the shank of the boring instrument by the collet bar is well understood in the art, consisting in the gripping action of the lower end portion of the collet 84 incident to the drawing of the head of the collet into the spindle 23 by the rotation of the collet bar 81 through manual manipulation of the wheel 82. Release of the tool is acomplished by the reverse action, and it will be understood, of course, that a drill, or the shank of any desired chuck, may be employed as well as any other form of boring instrument.

In operation, the pulley 17 being driven from a source of power not illustrated, and the spindle 23 being in its uppermost position, the cams 64 and 65 (see Figure 4) will be in engagement so that, although the spindle 23 will be revolving and the parts 29, 30, 31, 35, 48, 49 and 50 will be revolving, the other parts will be stationary. The operator grasps the handle of wheel 73 and turns it slightly, thus moving the cam 64 off of the high point of cam 65 and allowing the teeth of clutch member 53 to start to enter the spaces between the teeth 54 of the clutch member carried by gear 50. This movement allows power to be transmitted from gear 50 through the teeth of clutch member 53 to the radial projections 57 of the clutch ring 55, and thence to the shaft 51. Rotation of the shaft 51 causes the pinion 71, meshing with rack 72, to feed the rack 72 downward while the spindle 23 and the boring or drilling tool carried thereby is revolved. When the spindle 23 is approaching its lowermost position, the inclined faces of cams 64 and 65 will come in contact and by the time the spindle 23 has reached the lowermost limit of its movement, the pins 62 will have been moved, by the action of the cams 64 and 65 and the resulting movement of collar 63, from the position shown in Figure 5 to the position shown in Figure 4, whereat the teeth of the clutch member 53 are out of contact with the hub cluth member of gear 50 and the said gear 50 is thereby permitted to revolve freely on the shaft 51. It will be noted that the thrust of the cams 64 and 65 is just sufficient to cause the parts to take the position seen in Figure 4 for leaving the gear 50 idle on shaft 51, and when the pins 62 are in the position seen in Figure 4 the ends of said pins will ride across the ends of the teeth of clutch member 53, but will not be permitted to drop between any two of said teeth because of the presence of the projections 57 of clutch ring 55, over which projections said ends of the pins 62 will also ride. Because of the inclination of the sides of the clutch teeth of clutch members 53 and 54, the width of each projection 57 is not quite as great as the distance between adjacent sides of adjacent teeth of clutch member 53 at the free extremity thereof, but the space between said free ends and the respective projection 57 is not as great as the diameter of any of the pins 62, so that said pins will continue to ride as stated as long as the parts remain in the position seen in Figure 4. It should be observed, of course, that when the parts are in this position, the face of each projection 57 which is presented toward pins 63 is flush with the faces of the free ends of the teeth of clutch member 53. Return movement of the spindle 23 to its raised position is accomplished by a similar movement of the wheel 73 after the shifting of gear 30 across the face of friction disc 29 to the reverse position. It is noted that the parts come to a stop automatically at the conclusion of each longitudinal shift of the main spindle.

A plate 85 is located between the table 1 and the lower end of standard 13 for the purpose of accurately positioning the superimposed framework. If from any cause the exact angularity of spindle 23 is altered or its exact relative location is varied so that it gets out of line or out of true with respect to the table 1, the plate 85 is removed and shaped to take up the variation, and again introduced so that exact accuracy is assured.

Figure 13:
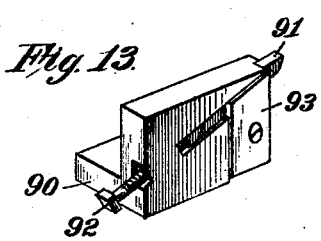
Figure 13 is a perspective view of the detachable tool holder detached.

In the use of the machine, it becomes desirable, in locating the first hole of the jig or die, to carry at the lower end of the spindle a plug of some fixed diameter from which to measure, and to provide a cutting tool positioned to operate upon the plug thus located, in order to make it absolutely accurate and true. To this end, I have designed the cutting tool holder seen in Figure 13, wherein the holder is shown as consisting of an angle block 90 whose horizontal web is adapted to be gripped by a clamp, such as clamp 5, and whose vertical web is grooved to receive the cutting tool 91 in position to be projected longitudinally more or less as required by the adjustment of a set screw 92 threaded through a part of the wall of the block 90 into position for contacting with the rear end of the tool 91. A detachable plate 93 retains the tool 91 against lateral separation from block 90. The cutter-bar carrying-block is held at any desired point on the plate 1 by means of one of the clamps 5.

What is claimed is:—

1. In an apparatus of the class described, the combination, with a frame and a spindle carried thereby, means for shifting the spindle, and means for rotating the spindle, of a driven belt for actuating the rotating means, an idler pulley for guiding the belt, said pulley having a face exposed away from the frame, means receiving power from the exposed face of the idler pulley for shifting the spindle, and means for adjusting the idler pulley axially away from the frame for varying its delivery of power.

2. In an apparatus of the class described, the combination, with a frame and a spindle carried thereby, means for shifting the spindle, and means for rotating the spindle, of a driven belt for actuating the rotating means, an idler pulley for guiding the belt, said pulley having a face exposed away from the frame, means receiving power from the exposed face of the idler pulley for shifting the spindle, and pins extending through the frame for adjusting the idler pulley axially away from the frame for varying its delivery of power.

3. In an apparatus of the class described, the combination, with a frame and a spindle, means for shifting the spindle relative to the frame, and means for rotating the spindle, of a driven belt for actuating the rotating means, an idler pulley at one side of the frame for guiding the belt, means receiving power from the idler pulley for shifting the spindle, and adjustable pins extending through the frame and engaging the idler pulley and adapted to adjust the same for varying its delivery of power.

4. In an apparatus of the class described, the combination, with a frame, a spindle rotatably and shiftably mounted therein, means for rotating the spindle, and means for shifting the spindle, of a belt for actuating the rotating means, a shaft extending through the frame, idler pulleys on the shaft engaging the laps of the belt for directing the belt, means carried by one of the idler pulleys for delivering power for actuating the shifting means, and means accessible through the other idler pulley for adjusting the first idler pulley for varying the delivery of power.

5. In an apparatus of the class described, the combination, with a frame, a spindle rotatably and shiftably mounted therein, means for rotating the spindle, and means for shifting the spindle, of a worm gear for actuating the shifting means, a worm meshing with said gear, a gear for rotating the worm, a pinion meshing with the last-named gear, a shaft shiftable through and splined to said pinion, a friction gear carried by said shaft, a friction disc engaging said friction gear, the said shaft being formed with a series of annular grooves, and a spring-pressed pin disposed to successively engage said grooves for retaining the shaft in any of various adjusted positions.

6. In an apparatus of the class described, the combination, with a frame, and a spindle rotatably and shiftably mounted therein, of means for rotating the spindle, means for shifting the spindle, a shaft for actuating the shifting means, a gear freely rotatably mounted on the shaft, means for rotating the gear, a clutch member engaging the gear, a co-operating clutch member rotatable on the shaft, and an interposed clutch ring keyed to the shaft and having radial projections adapted to extend between the teeth of one of the clutch members.

7. In an apparatus of the class described, the combination, with a frame, and a spindle rotatably and shiftably mounted therein, of means for rotating the spindle, means for shifting the spindle, a shaft for actuating the shifting means, a gear freely rotatably mounted on the shaft, means for rotating the gear, a clutch member engaging the gear, a co-operating clutch member rotatable on the shaft, an interposed clutch ring keyed to the shaft and having radial projections adapted to extend between the teeth of one of the clutch members, and pins passing through one of the clutch members in line with the teeth of the other clutch member and adapted to be moved for moving the clutch members out of clutch.

8. In an apparatus of the class described, the combination, with a frame, and a spindle rotatably and shiftably mounted therein, of means for rotating the spindle, means for shifting the spindle, a shaft for actuating the shifting means, a gear freely rotatably mounted on the shaft, means for rotating the gear, a clutch member engaging the gear, a co-operating clutch member rotatable on the shaft, an interposed clutch ring keyed to the shaft and having radial projections adapted to extend between the teeth of one of the clutch members, and pins passing through the clutch member of the gear in line with the teeth of the other clutch member and adapted to be moved for moving the clutch members out of clutch.

9. In an apparatus of the class described, the combination, with a frame, and a spindle rotatably and shiftably mounted therein, of means for rotating the spindle, means for shifting the spindle, a shaft for actuating the shifting means, a gear freely rotatably mounted on the shaft, means for rotating the gear, a clutch member engaging the gear, a co-operating clutch member rotatable on the shaft, an interposed clutch ring keyed to the shaft and having radial projections adapted to extend between the teeth of one of the clutch members, pins passing through one of the clutch members in line with the teeth of the other clutch member and adapted to be moved for moving the clutch members out of clutch, a collar keyed to the shaft, and a cam for shifting the collar in contact with the pins for moving them to the unclutched condition.

10. In an apparatus of the class described, the combination, with a frame, and a spindle rotatably and shiftably mounted therein, of means for rotating the spindle, means for shifting the spindle, a shaft for actuating the shifting means, a gear freely rotatably mounted on the shaft, means for rotating the gear, a clutch member engaging the gear, a co-operating clutch member rotatable on the shaft, an interposed clutch ring keyed to the shaft, and having radial projections adapted to extend between the teeth of one of the clutch members, pins passing through one of the clutch members in line with the teeth of the other clutch member and adapted to be moved for moving the clutch members out of clutch, a collar keyed to the shaft, a cam for shifting the collar in contact with the pins for moving them to the unclutched condition, and manual means for releasing the contact of the cam.

In testimony whereof I affix my signature in presence of two witnesses.

BERNARD T. STEBER.

Witnesses:
HOWARD STEBER,
MARION STEBER.